United States Patent Office.

GEORGE LUDWIG SCHAEFER, OF NEW YORK, N. Y., ASSIGNOR TO McKESSON & ROBBINS, OF SAME PLACE.

ANTISEPTIC COMPOUND.

SPECIFICATION forming part of Letters Patent No. 636,215, dated October 31, 1899.

Application filed January 18, 1898. Serial No. 667,084. (No specimens.)

*To all whom it may concern:*

Be it known that I, GEORGE LUDWIG SCHAEFER, a citizen of the United States, residing at New York, (Brooklyn,) in the county of Kings and State of New York, have invented certain new and useful Improvements in Antiseptic Compounds; and I do hereby declare the following to be a full, clear, and exact description of the invention, such as will enable others skilled in the art to which it appertains to make and use the same.

This invention relates to a new antiseptic compound intended especially for medicinal purposes; and it consists of the compound hereinafter described and claimed.

My invention consists, generally speaking, in a metallic salt of a sulfonic acid derived from one of the phenols, and particularly in the salts of the guaiacolsulfonic acids.

The phenols, as is well known, are bodies of noxious character, small doses administered internally being usually sufficient to cause death. They have also an irritant action on the skin and mucous surfaces.

The object of my invention is to produce a compound wherein the objectional and dangerous characteristics of the phenols are eliminated or destroyed, thereby rendering the same practically harmless, and so without materially affecting their known useful and important medicinal and antiseptic qualities. The compound, being free from the dangerous and caustic properties of the phenol, is also freed from the acidity of the sulfonic acid derivatives thereof, and is a neutral salt, odorless and free from corrosive action.

To produce the phenolsulfonic acids, the guaiacol, which may be taken as typical for this purpose, is sulfonated by treating with concentrated sulfuric acid till the mixture is clearly soluble in cold water. Uncombined guaiacol is then removed by shaking out with ether, benzol, &c. The residual mixture of sulfuric and guaiacolsulfonic acids may then be separated in various manners. If desired, the whole mass may be treated with a suitable base, resulting in a mixture of sulfonate and sulfate, which may be separated by crystallization. Any metallic hydrate, oxide, or carbonate may be used; but if those of lead, calcium, or barium be used the sulfuric acid is at once removed as an insoluble sulfate, leaving the sulfonates in solution, and from these any other metallic sulfonate may of course be obtained by double decomposition. If the proper amount of the foregoing bases are used, a more or less pure solution of free sulfonic acids may be filtered off from the insoluble sulfates, and this is neutralized with the carbonate, oxide, or hydrate of the proper base. These salts may be purified by repeated recrystallization, after which the desired sulfonate can be produced either by double decomposition of their salts with a salt of the desired base or by directly neutralizing the free sulfonic acid with hydrate, carbonate, &c. In this connection carbonate, hydrate, &c., of bismuth are used.

The bismuth salts are neutral, odorless, tasteless powders insoluble in water and alcohol. The salts are soluble in hydrochloric acid, forming the corresponding free sulfonic acid and bismuth chloride. They are broken up by carbonate of sodium, forming an insoluble carbonate of bismuth and a soluble guaiacolsulfonic of sodium.

The formula of the bismuth salt of guaiacolsulfonic acid, though somewhat indefinite, is substantially:

$$C_6H_3OHOCH_3SO_3BiO.$$

I desire it understood that the stated method of producing the guaiacolsulfonic acid is no part of my present invention and that other methods can be employed.

Having thus described the invention, what is claimed as new, and desired to be secured by Letters Patent, is—

A compound consisting of a bismuth salt of guaiacolsulfonic acid.

In testimony whereof I affix my signature in presence of two witnesses.

GEORGE LUDWIG SCHAEFER.

Witnesses:
WILHELM SCHAD,
EMIL LACCORN.